United States Patent
Koksbang et al.

Patent Number: 5,326,545
Date of Patent: Jul. 5, 1994

[54] METHOD OF MAKING LITHIUM BATTERY ELECTRODE COMPOSITIONS

[75] Inventors: Rene Koksbang, San Jose, Calif.;

[73] Assignee: Valence Technology, Inc., San Jose, Calif.

[21] Appl. No.: 39,872

[22] Filed: Mar. 30, 1993

[51] Int. Cl.⁵ ............................................. C01G 31/02
[52] U.S. Cl. ....................................... 423/62; 423/593
[58] Field of Search ................ 264/82, 104, 105, 144; 423/62, 593; 29/623.1, 623.5

[56] References Cited

U.S. PATENT DOCUMENTS

| | | | |
|---|---|---|---|
| 4,243,624 | 1/1981 | Jacobson et al. | 264/82 |
| 4,830,939 | 5/1989 | Lee et al. | 429/192 |
| 4,960,324 | 10/1990 | Brown | 350/357 |
| 5,013,620 | 5/1991 | Miyazaki et al. | 429/194 |
| 5,039,582 | 8/1991 | Pistoia | 429/218 |

Primary Examiner—Kathryn Gorgos
Attorney, Agent, or Firm—Linda Deschere

[57] ABSTRACT

Fine particles of vanadium oxide or lithiated vanadium oxide are less than 100 microns in size and on the order of 30 microns in size. Such fine particles are prepared by spray-drying a precursor mixture. Such oxide particles are also intermingled with fine particles of carbon by including carbon particles in the precursor mixture.

20 Claims, 1 Drawing Sheet

METHOD OF MAKING LITHIUM BATTERY ELECTRODE COMPOSITIONS

FIELD OF THE INVENTION

This invention relates to electrochemical batteries and more particularly to improved positive electrode material for use with lithium-containing negative electrodes.

BACKGROUND OF THE INVENTION

Current batteries contain high surface area transition metal oxide active material such as vanadium oxide powders. These oxide powders are obtained, for example, by milling of vanadium oxide material. Current methods for the manufacture of powders involve mechanical grinding of vanadium oxide material prepared, for example, by rapid quench of molten material or by precipitation from an aqueous solution. As a result, the vanadium oxide is in the form of lumps or large particles. By standard milling techniques it is difficult to reduce the lumps to a size less than 100 micrometers (microns) and extremely difficult to achieve a particle size closer to 10 microns. Smaller vanadium oxide particle sizes are desirable because the larger the surface area, the higher is the current drawn from a battery while the current density on the surface of the vanadium oxide active material remains low which allows high utilization of the active material. A typical coarse $V_2O_5$ powder of 95% purity available from Fisher Scientific Company, has a median particle size of about 110 microns and a surface area of about 5 meters$^2$/gram. Such a powder would need extensive milling.

Another problem posed by transition metal oxide active material is that it is necessary to add carbon to the composite cathode. The requirement for carbon and the amount thereof depends, to some extent, on the specific oxide. The electronic conductivity of vanadium oxides decreases substantially (2-4 orders of magnitude) during lithium insertion upon discharge of a battery. This increases the need for even greater amounts of added carbon. Methods which allow reduction of the carbon content are important in order to increase the specific energies of the battery.

SUMMARY OF THE INVENTION

According to one aspect of the invention, very fine particles of an oxide of vanadium, represented by the nominal general formula $V_2O_5$, are prepared by first forming a wet mixture comprising at least one volatile constituent and vanadium pentoxide, and then spray-drying the wet mixture. Spray-drying is preferably conducted using pressure nozzles which cause atomization by forcing the wet mixture under pressure at a high degree of spin through a small orifice. The wet mixture is thereby dispersed into fine droplets and dried by a relatively large volume of hot gasses sufficient to evaporate the volatile constituent, thereby providing very fine particles of the oxide of vanadium, nominally $V_2O_5$, having a size on the order of 100 microns or less. Desirably, particles of a median size less than about 50 microns are produced. It is preferred that the particle size be 30 microns or less and closer to 10 microns or less. It should be noted that median particle size refers to that size at which 50% by weight of the particles are, respectively, above and below in size.

Preferably, the volatile constituent is water and spray-drying takes place in an air stream. The temperature of the air at the outlet is preferably greater than 100° C. The inlet air stream is at an elevated temperature sufficient to remove a major portion of the water with a reasonable dryer volume, for a desired dry powder production rate and size. Air inlet temperature, droplet size and air flow rate are key factors which affect particle size and density of the product.

According to another aspect of the invention, there is provided a method for preparing an electrode material comprising fine particles of vanadium oxide and carbon. In this embodiment, the wet mixture comprising the volatile constituent(s) and an oxide of vanadium also includes fine particles of carbon. The oxide of vanadium is preferably represented by the general formula $V_2O_5$. The wet mixture is spray-dried as generally described above. The carbon particles are dispersed in the wet mixture and maintained in dispersion when the wet mixture is ejected from the orifice.

According to another aspect of the invention, fine particles of lithium-vanadium oxide of the nominal general formula $LiV_3O_8$ are prepared by forming a wet mixture comprising at least one volatile constituent, lithium hydroxide (LiOH) and an oxide of vanadium represented by the general formula $V_2O_5$. The LiOH is reacted with the $V_2O_5$ for a time and at a temperature sufficient to provide the lithium-vanadium oxide, $LiV_3O_8$. Desirably, the reaction takes place at a temperature of at least about 20° C.; and preferably in a range of about 20° C. to 60° C. It is desired that the LiOH be present in an amount sufficient to provide at least 1 mole of Li atoms for each 1.5 moles of the $V_2O_5$. Once the reaction to form $LiV_3O_8$ is completed, the mixture containing the $LiV_3O_8$ product is spray-dried as generally described above with regard to $V_2O_5$. This results in $LiV_3O_8$ being in the form of particles having a median size less than about 100 microns. Desirably, particles of a median size less than 50 microns are produced, and preferably 10 to 30 microns or less.

If desired, prior to spray-drying, the wet mixture may also include fine particles of carbon dispersed therein. The carbon may be added either before or after the reaction to form $LiV_3O_8$ takes place. Upon spray-drying, the product contains fine particles of $LiV_3O_8$ intermingled with the fine carbon particles.

Advantageously, the invention provides very fine particles of vanadium oxide or compounds thereof with or without carbon particles. The fine particles of the oxide powder are advantageously obtained in their preferred size, while minimizing formation of agglomerates which render such powders less effective for use as a cathode active material.

It is an object of the invention to provide electrodes of improved specific energies by reducing vanadium oxide particle size and by improving contact between oxide particles and conductive carbon of the electrode. Other objects include reducing cost of production, reducing or eliminating milling and increasing consistency and purity of the electrode active material.

These and other objects, features and advantages will become apparent from the following description of the preferred embodiments and accompanying drawings.

BRIEF DESCRIPTION OF THE DRAWING

The figure is an illustration of a cross-section of a thin battery or cell embodying the invention.

DETAILED DESCRIPTION OF THE PREFERRED EMBODIMENTS

Figure 1:
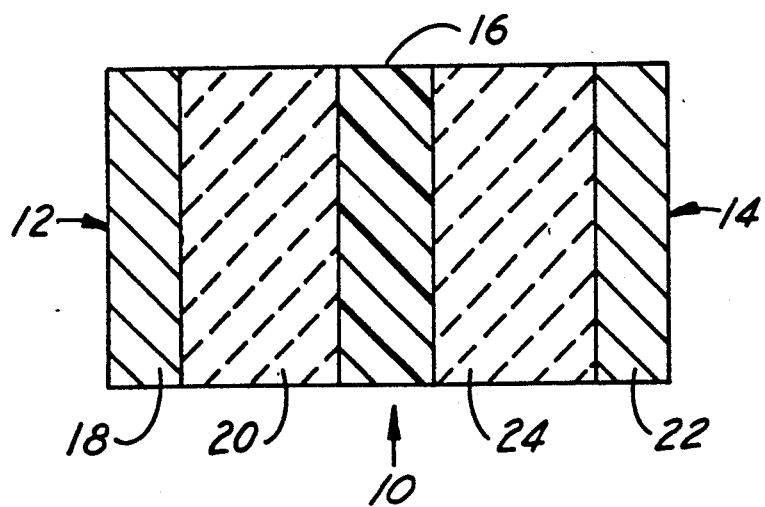

As shown in the drawing, an electrochemical cell or battery 10 has a negative electrode side 12, a positive electrode side 14, and a separator 16 therebetween. In accordance with common usage, a battery may consist of one cell or multiple cells. The negative electrode is the anode during discharge, and the positive electrode is the cathode during discharge. The negative electrode side includes current collector 18, typically of nickel, iron, stainless steel, and/or copper foil, and a body of negative electrode active material 20. The negative electrode active material 20 is sometimes simply referred to as the negative electrode. The positive electrode side includes current collector 22, typically of aluminum, nickel, iron, stainless steel, and/or copper foil, or such foils having a protective conducting coating foil, and a body of positive electrode active material 24 which has as its main component one or more oxides of vanadium. The positive electrode active material 24 is sometimes simply referred to as the positive electrode. The separator 16 is typically a solid electrolyte, electrolyte separator. A suitable electrolyte separator (polymer electrolyte) is described in U.S. Pat. No. 4,830,939 incorporated herein by reference. The electrolyte separator is a solid organic polymer matrix containing an ionically conducting liquid with an alkali metal salt and the liquid is an aprotic polar solvent.

In one embodiment, a cathode active material of the general formula $V_2O_5$ (vanadium pentoxide) is prepared in powder form. The fine particles of the powder are of a size on the order of 100 microns or less. The powder is prepared by first forming a mixture comprising at least one volatile constituent and an oxide of vanadium represented by the nominal general formula $V_2O_5$. The mixture is spray-dried thereby providing fine particles of the oxide of vanadium, less than 100 microns, desirably, less than 50 microns, and preferably, less than 10 microns.

If desired, carbon particles are dispersed in the mixture before spray-drying so as to provide fine particles of carbon intermingled with the vanadium oxide. The process of spray-drying facilitates dispersion of and an intermingling of the oxide and carbon constituents in the final product, and prevents coagulation of the constituents so as to maintain the product in the form of a very fine powder having fine particles of both carbon and oxide less than 100 microns, desirably less than 50 microns, and preferably less than 10 microns.

In the process of the invention, water is preferably the volatile constituent to be removed, although the wet mixture may include other components. It is known that 1 gram of vanadium pentoxide ($V_2O_5$) dissolves in about 125 milliliters of water. With lesser amounts of water, a viscous liquid or gel is formed. Such low water content gels are known as "xerogels".

During the process, water is removed or separated from the oxide in a stream of hot gas. Preferably, the volatile constituent is water and spray-drying takes place in an air stream. The temperature of the air at the outlet is preferably greater than 100° C. The inlet air stream is at an elevated temperature sufficient to remove a major portion of the water with a reasonable dryer volume, for a desired dry powder production rate and size. Air inlet temperature, droplet size and air flow rate are key factors which affect particle size and density of the product.

The equipment necessary to accomplish spray-drying depends on the quantity of material being spray-dried. In an experiment described below, an Anhydro lab model spray-dryer was used which is capable of drying up to about 7.5 kg of water per hour. This Anhydro spray-dryer dried 14 liters of the wet mixture using an air flow rate of 125 $m^3$/hour with a temperature drop of about 150° C. The spray-drying reduced the moisture content to the order of 1% to 10% by weight, while producing an oxide product in the form of particles having a size of about 20 microns. To further ensure that small particle size is achieved during the spray-drying process, it may be desirable to place the precursor materials in a sieve and filter them to first remove large particles. This ensures that carbon particles, which do not dissolve in water, are of a sufficiently small size in the final product.

The solid content of the aqueous mixture was in the range of 100 grams to 200 grams of vanadium pentoxide solid per 400 ml of water. When carbon is included, the solid content (carbon and $V_2O_5$) is adjusted to provide about 5 parts $V_2O_5$ for each 1 part carbon.

A more specific discussion of the spray-drying process follows below with respect to the $LiV_3O_8$ oxide product. Similar conditions apply to both the $LiV_3O_8$ and $V_2O_5$ products. A discussion of the general background of spray-drying may also be found in Perry's "Chemical Engineer's Handbook", 4th Edition, published by McGraw Hill.

The spray-drying method of the invention was used to prepare $LiV_3O_8$ in a completely amorphous state with and without carbon. The amorphous state is beneficial for rate capabilities and energy density. This composite is prepared by forming the aqueous $V_2O_5$ mixture, as described above and including LiOH in the mixture. The amount of $V_2O_5$ and LiOH correspond to the stoichiometric amounts of the two compounds needed for formation of $LiV_3O_8$. It is thought that part of the $V_2O_5$ dissolves in solution, followed by reaction between the dissolved $V_2O_5$, LiOH and water and then with the remaining solid $V_2O_5$, with the subsequent formation of $LiV_3O_8$. The reaction is fairly slow at room temperature, on the order of 10° C. to 40° C., and typically around 20° C. The reaction proceeds at a reasonable rate at about 50° C. to 60° C. A process of adding progressive amounts of vanadium pentoxide to an LiOH solution is more fully described in U.S. Pat. No. 5,039,582 which is incorporated in its entirety by reference. The $LiV_3O_8$ product typically forms a very fine precipitate.

In the experimental method of this invention, following preparation of $V_2O_5$, the $V_2O_5$ is added to the LiOH solution. If the $V_2O_5$ is added sufficiently slowly, it is clearly dissolved. The initial suspension of the powder is seen as particles which gradually disappear and the solution then becomes clear.

The $LiV_3O_8$ prepared according to the stated procedure may actually be a fine powder, but because of the high concentrations used, it appears as a high viscosity liquid, cream, or gel. It is this liquid which is used for spray-drying. Similar liquids of $V_2O_5$ are also formed. The two types of liquids are similar. The $V_2O_5$ is called a xerogel and it is the gel which gave this type of material their group name, xerogel. The particle size probably depends on the viscosity of the liquids. Lower viscosity probably result in smaller particles after atomization. A typical composition used for the formation of $LiV_3O_8$ is as follows: 400 ml $H_2O$; 12 g LiOH (=0.5 mol); 136.5 g $V_2O_5$ (=0.75 mol).

In various experiments, the LiOH was dissolved in the water and heated to about 50° C. The $V_2O_5$ was then added gradually over a period of 2–30 minutes. The rate of adding the $V_2O_5$ did not seem to affect the result. Similarly, the temperature had been varied between approximately 50° C. and 85° C. without any notice effect. It is probably possible to prepare the $LiV_3O_8$ gel even when the concentrations of LiOH and $V_2O_5$ are reduced to one third of the amounts given above. Similarly, it is possible to increase the concentration about a factor of 4, but in this case, the resulting material is practically solid. Smaller particle sizes are expected at lower concentrations; however, the correlation between viscosity and the initial composition is not well-known.

The aqueous mixture containing the $LiV_3O_8$ product was then spray-dried, with the objective of achieving as small a particle size and as low a water content as possible. There was used approximately 14 liters of the amorphous $LiV_3O_8$ in water. The solid content was measured to be between 15% and 20% by weight.

The experiment equipment used was as follows:

| | |
|---|---|
| Laboratory spray-dryer: | No. 1 - by Anhydro* |
| Feeding system: | Peristaltic pump |
| Atomizer: | Centrifugal atomizer, type CD63 |
| Wheel diameter: | 63 mm |
| Heating system: | Electrical |
| Drying chamber: | Conical. All powder to the cyclone |
| Chamber diameter: | 1.000 mm |
| Powder separation: | Cyclone |
| Amount of dry air: | 125 m³/h |

*APV Pasilac Anhydro A/S is represented in the U.S. by:
APV Crepaco Inc.
Dryer Division
165 John L Dietsch Square
Attleboro Falls, Massachusetts 02763

Anhydro makes spray dryers in many sizes, the above-described unit is known as a laboratory spray-dryer, and it can dry (remove) up to 7.5 kg of water per hour. The unit was used to dry approximately 14 liters of amorphous $LiV_3O_8$ in water. The solid content was measured to be between 15 and 20 weight percent. The parameters which could be varied on the unit were: atomizer type, inlet temperature, air feed rate and liquid feed rate. In this case, the atomizer was a centrifugal type (50,000 RPM) and the air flow was fixed. The operating conditions were set to achieve particle size as small as possible, and the operating conditions were chosen for that. The material was stirred continuously before feeding into the spray-drier. This was necessary to maintain a homogeneous suspension. The start-up went smoothly, and a steady-state operation was achieved with a inlet air stream temperature of approximately 280° C. and a liquid feed rate, which gave an outlet air temperature of approximately 120° C. Interestingly, the product temperature never exceed the outlet temperature. Sample of the product, which was a fine powder, contained 2.2 weight percent and 8.6 weight percent of water, as shown in Table 1. The total process time for the 14 liters was approximately 3 hours, but the operation was stopped twice, once because of the need to position a magnetic bar in one of the batches, and once because of inadequate cleaning during the shut-down.

A rough mass-balance on the final product indicated that approximate 40% or more of the material was lost due to handling, but more significantly because some of the particles were too small to be stopped by the cyclone. This makes it necessary to use a bag-filter (or additional cyclones). Despite this, very small particle size was achieved.

TABLE 1

| Experimental Results | | | |
|---|---|---|---|
| Run number | | 1 | 2 |
| Time | min | 90 | 90 |
| Feed product | kg | 8 | 8 |
| Dry material in feed product | % | 19.6 | 19.6 |
| Atomizer speed | rpm | 15000 | 15000 |
| Inlet temperature | °C. | 280 | 280 |
| Outlet temperature | °C. | 129 | 129 |
| Amount of powder | kg | 0.78 | 0.66 |
| Remaining moisture | % | 2.2 | 8.6 |
| Bulk density, pressed | g/ml | 0.81 | 0.73 |
| Bulk density, unpressed | g/ml | 1.04 | 0.97 |
| Particle size, RRB average diameter | μm | 26 | 20 |
| Particle size, standard deviation | n | 2.4 | 2.6 |

The particle sizes are measured by laser diffraction, type Malvern. The amount of dry material in the feed product was measured by heating with an infra red lamp system at 105° C. for 30 minutes. Approximately, 50% of the powder has passed through the cyclone due to the small particle size and was lost. A filter is, therefore, needed after the cyclone.

If desired, prior to freeze-drying, carbon particles are dispersed in the aqueous solution either before or after reaction to form $LiV_3O_8$ takes place. Preferably, the reaction to form $LiV_3O_8$ is conducted while keeping the carbon and undissolved $V_2O_5$ dispersed in solution, so that the contact between the product $LiV_3O_8$ and the carbon is optimized. Advantageously, because part of the $V_2O_5$ is dissolved during the procedure, intimate mixing between the $V_2O_5$ precursor (from which the $LiV_3O_8$) is formed and the carbon is essentially automatically achieved.

Carbon particles may be obtained from Noury Chemical Corporation, under the designation Ketjen Black. The Ketjen Black particles, in an as-received condition, have a BET surface area of approximately 900 m²/gram. Ketjen Black has an average or median particle size or equivalent average diameter in the range of about 10 to about 100 nanometers (0.01 to 0.1 microns), and typically in the order of 30 nanometers. Thus, the carbon particles and oxide particles are very fine and of micron or submicron size.

The product of the method of the invention is essentially in the form of carbon particles coated with the vanadium oxide or lithium-vanadium oxide ($LiV_3O_8$) or, depending on the relative sizes of the carbon particles and the vanadium oxide particles, the oxide particles may be coated with carbon. In any event, intimate mixing and intimate contact between carbon grains and oxide grains is achieved by the method of the invention. Thus, the advantages of this procedure are that there is improved grain-to-grain contact between carbon and vanadium oxide particles ($V_2O_5$ or $LiV_3O_8$), and also between the various carbon particles, which enhances the electric contacts in the carbon and vanadium oxide network of the composite electrode.

The vanadium oxide active materials ($V_2O_5$ or $LiV_3O_8$) of the invention were used to prepare cells with lithium-based anodes. Several cells were prepared by mixing oxide active material, carbon (typical Shawinigan Black) and electrolyte/binder. The oxides were prepared with and without carbon. Thus, in some cases, carbon particles were added after fine particles of the oxide active material had been formed. Typical cathode constituents are as given in Table 2.

TABLE 2

| Typical Cathode Composition | Percent by Weight |
|---|---|
| Vanadium Oxide ($V_2O_5$ or $LiV_3O_8$) | 49% |
| Carbon | 11% |
| Propylene Carbonate (PC) | 28% |
| PolyEthylene Oxide (PEO) | 1% |
| PolyEthyleneGlycolDiAcrylate (PEGDA) | 9% |
| TriMethylPolyEthylene Oxide TriAcrylate (TMPEOTA) | 2% |

The weight ratio carbon/active material, used in conventional batteries, is approximately 1:10. An objective is to reduce the ratio and it is actually preferred to have no carbon. However, a lower limit target is a range of 3-15 weight percent carbon relative to the active material. A typical cathode contains about 10 weight percent carbon, 50 weight percent active material and the remaining material is then binder and electrolyte. The invention permits one to raise the content of the active material to about 65 weight percent. A higher content is desired, but with the presently used materials and manufacturing techniques, a target upper limit for combined carbon and active material is in the range 70-80 weight percent of the cathode composition.

The cathode is coated onto nickel foil followed by electron beam curing (cross-linking/polymerization) of the acrylate component. Then the electrolyte is coated on top of the cathode and cured with ultraviolet light. The lithium electrode is applied on top of the electrolyte separator and the battery is finally placed in a flexible pouch which is heat sealed under vacuum.

The energy density of the batteries based on these new electrode materials with smaller oxide particles is improved. This is believed to be achieved by decreasing carbon content of the cathode, providing better contact between the carbon and the vanadium oxide. The lesser carbon content compared to what would otherwise be required, is due to the increased contact which increases the electronic conductivity allowing higher current drains, while the energy density remains essentially unchanged.

The method of the invention eliminates, or at least reduces, the need for standard milling techniques, which reduce particle size to less than 100 microns and which it is difficult to reduce particle size to about 50 microns. Since suitable particle size, less than 50 microns, is achieved by intimate mixing with carbon to form an electronically conducting carbon network with good contact to the active material on a microscopic scale, the invention avoids heavy-duty milling methods. However, if desired, milling of the final product is possible because the degree of milling is lessened. That is, the mixing force of any subsequent milling step would be very much be reduced.

While this invention has been described in terms of certain embodiments thereof, it is not intended that it be limited to the above description, but rather only to the extent set forth in the following claims.

The embodiments of the invention in which an exclusive property or privilege is claimed are defined in the appended claims.

I claim:

1. A method of preparing a vanadium oxide based active material composition for an electrode of an electrochemical cell, by the steps consisting essentially of:
   a. forming a wet mixture comprising at least one volatile constituent and an oxide of vanadium represented by the general formula $V_2O_5$;
   b. atomizing the mixture of step (a) to form droplets thereof and contacting the droplets with a stream of hot gas at a temperature to evaporate such volatile constituent thereby providing fine particles of the oxide of vanadium at least a major portion of such particles represented by the general formula $V_2O_5$;
   c. directing the fine particles onto a collection surface; and
   d. removing the fine particles from the collection surface to form a collection of powder material suitable for use in an electrode of an electrochemical cell.

2. The method according to claim 1, wherein the volatile constituent of step (a) is water in an amount to provide the mixture in the form of a gel.

3. The method according to claim 1, wherein the volatile constituent of step (a) is water in an amount to provide the mixture having a viscosity less than that of a gel.

4. The method according to claim 1, wherein the hot gas is air and the temperature is not less than 100° C.

5. The method according to claim 1, wherein the mixture further includes fine particles of carbon and step (b) further includes dispersing the carbon particles among the vanadium oxide particles thereby providing a powder consisting essentially of intermingled particles of the vanadium oxide and the carbon.

6. The method according to claim 5, wherein the carbon particles are larger than the vanadium oxide particles and step (b) further includes depositing the smaller vanadium oxide particles on the larger carbon particles.

7. The method according to claim 1 wherein the collection surface has an average surface temperature which is less than the temperature of the hot gas of step (b).

8. A method of preparing vanadium oxide based active material composition for an electrode of an electrochemical cell, comprising:
   a. forming a wet mixture comprising at least one volatile constituent, lithium hydroxide (LiOH) and an oxide of vanadium represented by the general formula $V_2O_5$ and reacting the LiOH with the $V_2O_5$ for a time and at a temperature to provide lithium-vanadium oxide of the nominal general formula $LiV_3O_8$;
   b. atomizing the mixture of step (a) to form droplets thereof and contacting the droplets with a stream of hot gas at a temperature to evaporate such volatile constituent thereby providing fine particles of the lithium-vanadium oxide having the nominal general formula $LiV_3O_8$;
   c. directing the fine particles onto a collection surface; and
   d. removing the fine particles from the collection surface to form a collection of powder material suitable for use in an electrode of an electrochemical cell.

9. The method according to claim 8, wherein the temperature of step (a) is at least about 20° C.

10. The method according to claim 8, wherein the temperature of step (a) is in a range of about 20° C. to about 60° C.

11. The method according to claim 8, wherein the LiOH is present in an amount to provide 1 mole of Li atoms for each 1.5 moles of the $V_2O_5$.

12. The method according to claim 8, wherein the volatile constituent of step (a) is water in an amount to provide the mixture in the form of a gel.

13. The method according to claim 8, wherein the volatile constituent of step (a) is water in an amount to provide the mixture having a viscosity less than that of a gel.

14. The method according to claim 8, wherein the hot gas is air and the temperature is not less than 100° C.

15. The method according to claim 8, wherein the mixture further includes fine particles of carbon and step (b) further includes dispersing the carbon particles among the vanadium oxide particles thereby providing a powder consisting essentially of intermingled particles of the vanadium oxide and the carbon.

16. The method according to claim 15, wherein the carbon particles are larger than the vanadium oxide particles and step (b) further includes depositing the smaller vanadium oxide particles on the larger carbon particles.

17. The method according to claim 8 wherein the collection surface is at a temperature in a range selected to maintain the chemical and physical characteristics of the particles of step (b).

18. The method according to claim 8 wherein the collection surface has an average surface temperature which is less than the temperature of the hot gas of step (b).

19. A method of preparing a vanadium oxide based active material composition for an electrode of an electrochemical cell, comprising:
  a. forming a wet mixture comprising at least one volatile constituent and an oxide of vanadium represented by the general formula $V_2O_5$;
  b. atomizing the mixture of step (a) to form droplets thereof and contacting the droplets with a stream of hot gas at a temperature to evaporate such volatile constituent thereby providing fine particles of the oxide of vanadium at least a major portion of such particles represented by the general formula $V_2O_5$;
  c. directing the fine particles onto a collection surface at a temperature in a range selected to maintain the chemical and physical characteristics of the particles of step (b); and
  d. removing the fine particles from the collection surface to form a collection of powder material suitable for use in an electrode of an electrochemical cell.

20. The method according to claim 19 wherein the collection surface has an average surface temperature which is less than the temperature of the hot gas of step (b).

* * * * *